United States Patent
Endo

(10) Patent No.: US 11,539,282 B2
(45) Date of Patent: Dec. 27, 2022

(54) SWITCHING CONTROL CIRCUIT AND POWER SUPPLY CIRCUIT

(71) Applicant: FUJI ELECTRIC CO., LTD., Kawasaki (JP)

(72) Inventor: Yuta Endo, Matsumoto (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 70 days.

(21) Appl. No.: 17/237,185

(22) Filed: Apr. 22, 2021

(65) Prior Publication Data

US 2021/0391781 A1 Dec. 16, 2021

(30) Foreign Application Priority Data

Jun. 16, 2020 (JP) .............................. JP2020-104005

(51) Int. Cl.
*H02M 1/42* (2007.01)
*H02M 1/00* (2006.01)
*H02M 7/217* (2006.01)

(52) U.S. Cl.
CPC ....... *H02M 1/0012* (2021.05); *H02M 1/0058* (2021.05); *H02M 1/4208* (2013.01); *H02M 7/217* (2013.01)

(58) Field of Classification Search
CPC .... H02M 1/0012; H02M 1/0058; H02M 1/08; H02M 1/4208; H02M 1/007; H02M 1/4225; H02M 1/42; H02M 1/32; H02M 7/217; H02M 7/06; H02M 3/157; H02M 3/156
See application file for complete search history.

(56) References Cited

U.S. PATENT DOCUMENTS 8,823,339 B2 * 9/2014 Lee ...................... H02M 3/156 323/207
8,963,535 B1 * 2/2015 Melanson .............. H03K 17/90 324/252

(Continued)

FOREIGN PATENT DOCUMENTS

| JP | 5326804 B2 | 10/2013 |
| JP | 2017-070192 A | 4/2017 |
| WO | 2010/061654 A1 | 6/2010 |

*Primary Examiner* — Kyle J Moody
*Assistant Examiner* — Jye-June Lee
(74) *Attorney, Agent, or Firm* — Rabin & Berdo, P.C.

(57) ABSTRACT

A switching control circuit for controlling a power supply circuit that generates an output voltage from an alternating current (AC) voltage inputted thereto. The power supply circuit includes an inductor receiving a rectified voltage corresponding to the AC voltage, and a transistor controlling an inductor current flowing through the inductor. The switching control circuit controls switching of the transistor, and includes a first arithmetic circuit that calculates a first time period, from when the transistor is turned off to when the inductor current reaches a predetermined value, based on a first voltage corresponding to the rectified voltage, a second voltage corresponding to the output voltage, and the inductor current upon turning on of the transistor; and a drive circuit that causes the transistor to be on in a second time period corresponding to the second voltage, and causes the transistor to be off in the first time period.

12 Claims, 9 Drawing Sheets

(56) References Cited

U.S. PATENT DOCUMENTS

| | | | |
|---|---|---|---|
| 2011/0057637 A1* | 3/2011 | Liu | H02M 3/156 323/287 |
| 2011/0115458 A1* | 5/2011 | Schafmeister | H02M 3/156 323/284 |
| 2017/0093301 A1* | 3/2017 | Nakano | H02M 1/42 |
| 2019/0052179 A1* | 2/2019 | Bhandarkar | H02M 3/1563 |

* cited by examiner

SWITCHING CONTROL CIRCUIT AND POWER SUPPLY CIRCUIT

The present application claims priority pursuant to 35 U.S.C. § 119 from Japanese patent application number 2020-104005 filed on Jun. 16, 2020, the entire disclosure of which is hereby incorporated by reference herein.

BACKGROUND

Technical Field

The present disclosure relates to a switching control circuit and a power supply circuit.

Description of the Related Art

Some of power factor correction ICs used for AC-DC converters operate in a critical mode, in which a transistor is turned on when an inductor current flowing through an inductor of the AC-DC converter reaches substantially zero. Such power factor correction ICs may use a calculation method for obtaining a timing at which the inductor current reaches substantially zero by calculating based on an input voltage and an output voltage (for example, Japanese Patent No. 5326804, Japanese Patent Application Publication 2017-070192, and International Publication No. WO2010/061654).

Incidentally, such a power factor correction IC for the critical mode that uses the above-described calculation method might operate in a continuous mode, in which the transistor is turned on when the inductor current is still flowing, since values of elements of the AC-DC converter that generate voltages corresponding to the input voltage and the output voltage deviate from their rated values.

The present disclosure is directed to provision of a technique of causing an AC-DC converter to operate in a critical mode even when a value of an element of the AC-DC converter deviates from a rated value.

SUMMARY

An aspect of the present disclosure is a switching control circuit for controlling a power supply circuit that generates an output voltage from an alternating current (AC) voltage inputted thereto, the power supply circuit including an inductor configured to receive a rectified voltage corresponding to the AC voltage, a transistor configured to control an inductor current flowing through the inductor, the switching control circuit being configured to control switching of the transistor, the switching control circuit comprising: a first arithmetic circuit configured to calculate a first time period, which is from when the transistor is turned off to when the inductor current reaches a predetermined value based on a first voltage corresponding to the rectified voltage, a second voltage corresponding to the output voltage, and the inductor current upon turning on of the transistor; and a drive circuit configured to cause the transistor to be on in a second time period corresponding to the second voltage, and cause the transistor to be off in the first time period.

Another aspect of the present disclosure is a switching control circuit for controlling a power supply circuit that generates an output voltage from an alternating current (AC) voltage inputted thereto, the power supply circuit including an inductor configured to receive a rectified voltage corresponding to the AC voltage, a transistor configured to control an inductor current flowing through the inductor, the switching control circuit being configured to control switching of the transistor, the switching control circuit comprising: a storage circuit; and an arithmetic circuit, the arithmetic circuit including a first arithmetic unit configured to calculate a first time period, which is from when the transistor is turned off to when the inductor current reaches a predetermined value based on a first voltage corresponding to the rectified voltage, a second voltage corresponding to the output voltage, and the inductor current upon turning on of the transistor.

Another aspect of the present disclosure is a power supply circuit that generates an output voltage from an alternating current (AC) voltage inputted thereto, the power supply circuit comprising: an inductor configured to receive a rectified voltage corresponding to the AC voltage; a transistor configured to control an inductor current flowing through the inductor; a first arithmetic circuit configured to calculate a first time period, which is from when the transistor is turned off to when the inductor current reaches a predetermined value, based on a first voltage corresponding to the rectified voltage, a second voltage corresponding to the output voltage, and the inductor current upon turning on of the transistor; and a drive circuit configured to cause the transistor to be on in a second time period corresponding to the second voltage, and cause the transistor to be off in the first time period.

DETAILED DESCRIPTION

At least the following matters will become apparent from the description in the present specification and the accompanying drawings.

Embodiment

Figure 1:
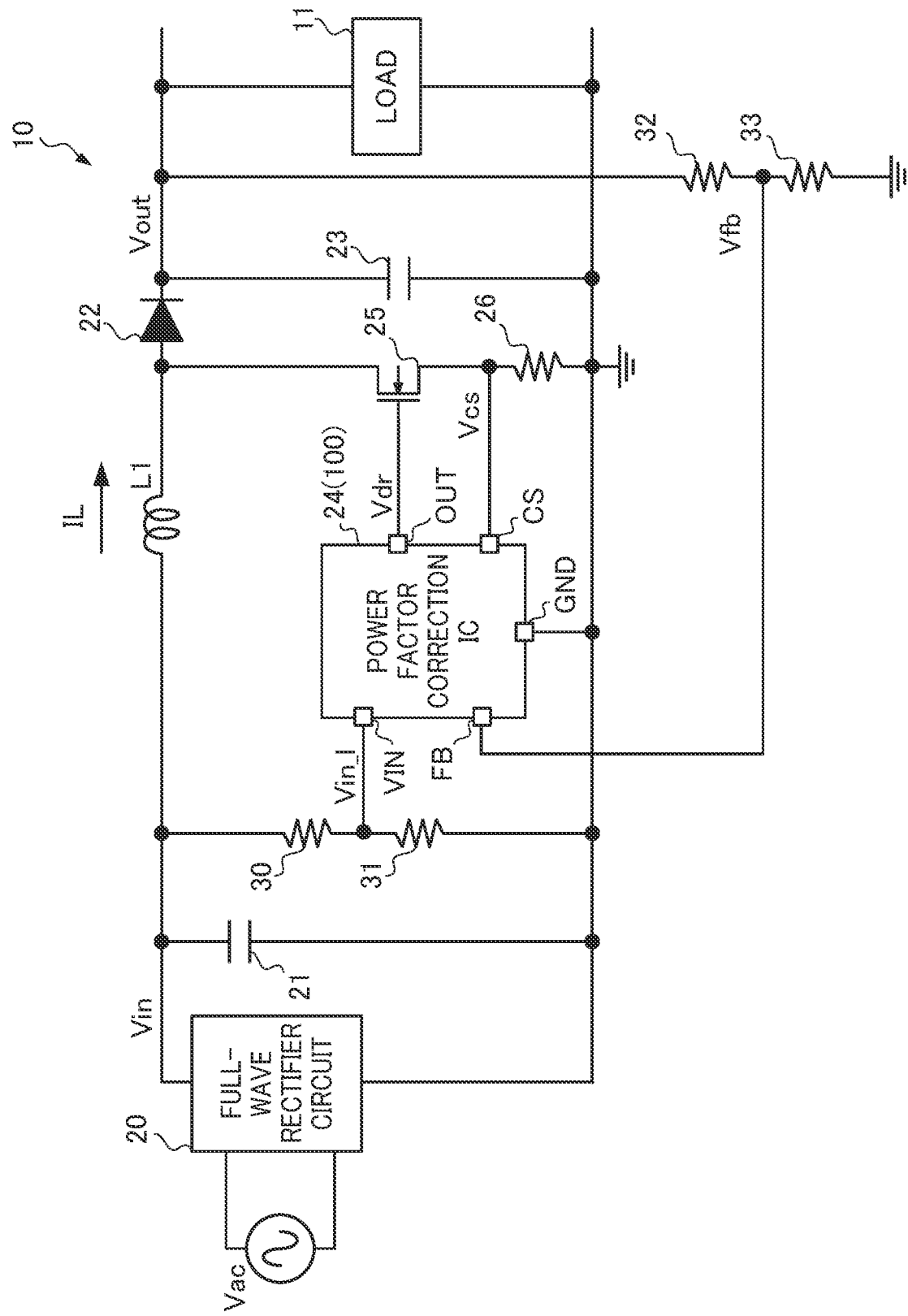
FIG. 1 is a diagram illustrating an example of a configuration of an AC-DC converter 10.

FIG. 1 is a diagram illustrating an example of a configuration of an AC-DC converter 10 according to an embodiment of the present disclosure. The AC-DC converter 10 is a boost chopper type power supply circuit that generates an output voltage Vout at a target level from an alternating-current (AC) voltage Vac of a commercial power supply.

A load 11 is, for example, a DC-DC converter, an electronic device that operates with a direct-current (DC) voltage, and/or the like.

<<<Outline of AC-DC Converter 10>>>

The AC-DC converter 10 includes a full-wave rectifier circuit 20, capacitors 21 and 23, a diode 22, a power factor correction IC 24, an NMOS transistor 25, and resistors 26 and 30 to 33.

The full-wave rectifier circuit 20 full-wave rectifies the predetermined AC voltage Vac to generate a rectified voltage Vin and applies the rectified voltage Vin to the capacitor 21 and an inductor L1.

Note that the rectified voltage Vin is directly applied to the inductor L1, however, the rectified voltage Vin may be applied to the inductor L1 via an element such as a resistor (not illustrated), for example. The capacitor 21 is an element that smooths the rectified voltage Vin.

The inductor L1 constitutes a boost chopper circuit with the diode 22, the capacitor 23, and the NMOS transistor 25. Accordingly, a charge voltage of the capacitor 23 results in the direct-current output voltage Vout.

The power factor correction IC 24 is an integrated circuit that controls the switching of the NMOS transistor 25 to cause the output voltage Vout to reach a target level while improving the power factor of the AC-DC converter 10. Specifically, the power factor correction IC 24 drives the NMOS transistor 25 based on an inductor current IL flowing through the inductor L1, the rectified voltage Vin, and the output voltage Vout.

The power factor correction IC 24 is provided with terminals VIN, FB, OUT, CS, and GND. Details of the power factor correction IC 24 will be described later. Although the power factor correction IC 24 is provided with more terminals other than the above-described five terminals VIN, FB, OUT, CS, and GND, they are omitted for the sake of convenience. Further, the terminal GND is grounded.

The NMOS transistor 25 is a transistor for controlling the power to the load 11 of the AC-DC converter 10. In an embodiment of the present disclosure, the NMOS transistor 25 is a metal oxide semiconductor (MOS) transistor, however, it is not limited thereto. As long as the NMOS transistor 25 is a transistor capable of controlling the power, the NMOS transistor 25 may be another transistor such as a bipolar transistor, for example. The NMOS transistor 25 has a gate electrode coupled to the terminal OUT so as to be driven by a drive signal Vdr from the terminal OUT.

The resistor 26 on the ground side of the NMOS transistor 25 is an element that generates a voltage Vcs corresponding to the inductor current IL upon turning on of the NMOS transistor 25. The voltage Vcs generated at the resistor 26 is applied to the terminal CS.

The resistors 30 and 31 constitute a first voltage divider circuit that divides the rectified voltage Vin to generate an input voltage Vin_1, which is used when switching the NMOS transistor 25. The input voltage Vin_1 generated at a node to which the resistors 30 and 31 are coupled is applied to the terminal VIN.

The resistors 32 and 33 constitute a second voltage divider circuit that divides the output voltage Vout to generate a feedback voltage Vfb, which is used for switching the NMOS transistor 25. The feedback voltage Vfb generated at a node to which the resistors 32 and 33 are coupled is applied to the terminal FB.

The AC-DC converter 10 corresponds to a "power supply circuit", and the power factor correction IC 24 corresponds to a "switching control circuit".

Figure 2:
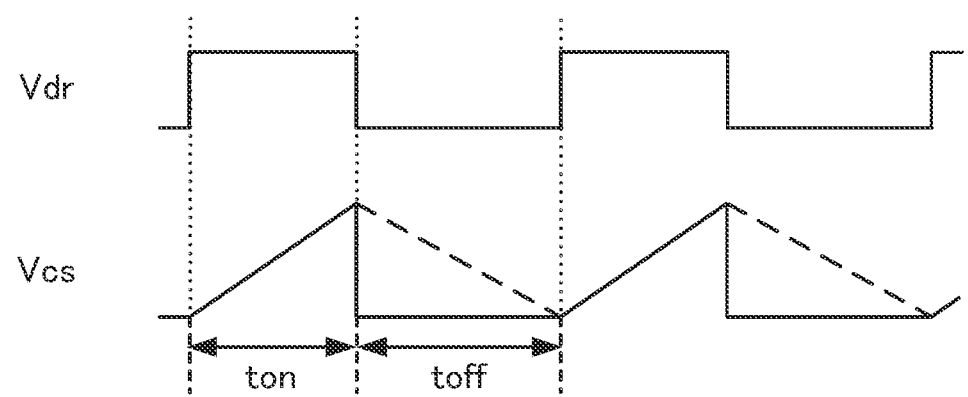
FIG. 2 is a diagram illustrating an example of a drive signal Vdr and a voltage Vcs when each of resistance values of resistors 30 to 33 is a rated value.

FIG. 2 is a diagram illustrating a relationship between the drive signal Vdr and the voltage Vcs when a resistance value of each of the resistors 30 to 33 is a rated value.

Hereinafter, a description will be given of a relationship between an ON period ton, which is a time period during which the NMOS transistor 25 is on, and an OFF period toff, which is a time period during which the NMOS transistor 25 is off. When the power factor correction IC 24 outputs the drive signal Vdr at a high level (hereinafter, referred to as high or high level) and the ON period ton has elapsed, the power factor correction IC 24 outputs the drive signal Vdr at a low level (hereinafter, referred to as low or low level). Then, when the OFF period toff has elapsed, the power factor correction IC 24 outputs the high drive signal Vdr again.

In the AC-DC converter 10, when a current that flows during the ON period ton is referred to as a current Ion, the current Ion is expressed as follows:

$$Ion = Vin/L \times ton \quad (1)$$

where L is an inductance of the inductor L1.

On the other hand, when a current that flows during the OFF period toff is referred to as a current Ioff, the current Ioff is expressed as follows:

$$Ioff = (Vout - Vin)/L \times toff \quad (2).$$

When the AC-DC converter 10 is operated in a critical mode, the current Ion is equal to the current Ioff. Thus, according to the expressions (1) and (2), the OFF period toff is expressed as follows:

$$toff = ton \times Vin/(Vout - Vin) \quad (3).$$

In a case where the power factor correction IC 24 turns on the NMOS transistor 25 when the inductor current reaches substantially zero, and turns off the NMOS transistor 25 in the OFF period toff expressed by the expression (3), as illustrated in FIG. 2, the AC-DC converter 10 results in operating in the critical mode.

However, in the actual AC-DC converter 10, the rectified voltage Vin and the output voltage Vout are obtained as the voltages Vin_1 and Vfb generated by the first voltage divider circuit and the second voltage divider circuit, respectively, and the OFF period toff is calculated as expressed by the following expression:

$$toff = ton \times Vin\_1/(Vfb - Vin\_1) \quad (4)$$

The first voltage divider circuit divides the rectified voltage Vin so as to be reduced into 1/N (N is a positive number), thereby generating the voltage Vin_1. Similarly, the second voltage divider circuit divides the output voltage Vout so as to be reduced into 1/N (N is a positive number), thereby generating the voltage Vfb. The voltage divider ratios of the first and second voltage divider circuits result in being equal to each other. When the voltage divider ratios are different from each other, the calculation of the expression (4) may be adjusted.

Figure 3:
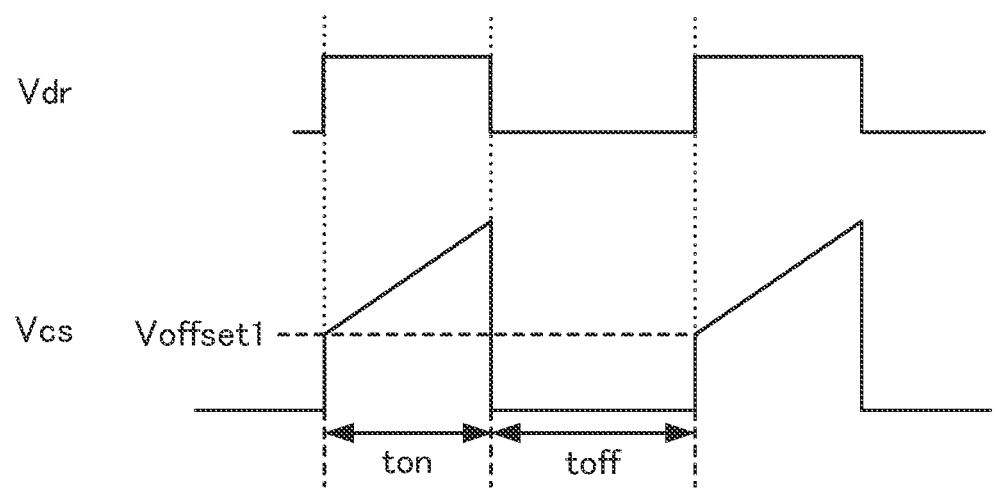
FIG. 3 is a diagram illustrating an example of a drive signal Vdr and a voltage Vcs when at least one of resistance values of resistors 30 to 33 deviates from corresponding one of their rated values.

The resistance values of the resistors 30 to 33 constituting the first voltage divider circuit and the second voltage divider circuit deviate from their rated values in general. For example, when the resistance value of the resistor 31 is smaller than the rated value, the voltage Vin_1 becomes small, and the OFF period toff calculated by the expression (4) becomes shorter than the OFF period toff of the expression (3). Consequently, as illustrated in FIG. 3, the inductor current IL does not decrease to zero in the OFF period toff, and the AC-DC converter 10 operates in the continuous mode.

Accordingly, the AC-DC converter 10 according to an embodiment of the present disclosure comprises the power factor correction IC 24, which causes the AC-DC converter 10 to operate in the critical mode even when at least one of the resistance values of the resistors 30 to 33 deviates from corresponding one of their rated value.

<<<Configuration of Power Factor Correction IC 24>>>

Figure 4:
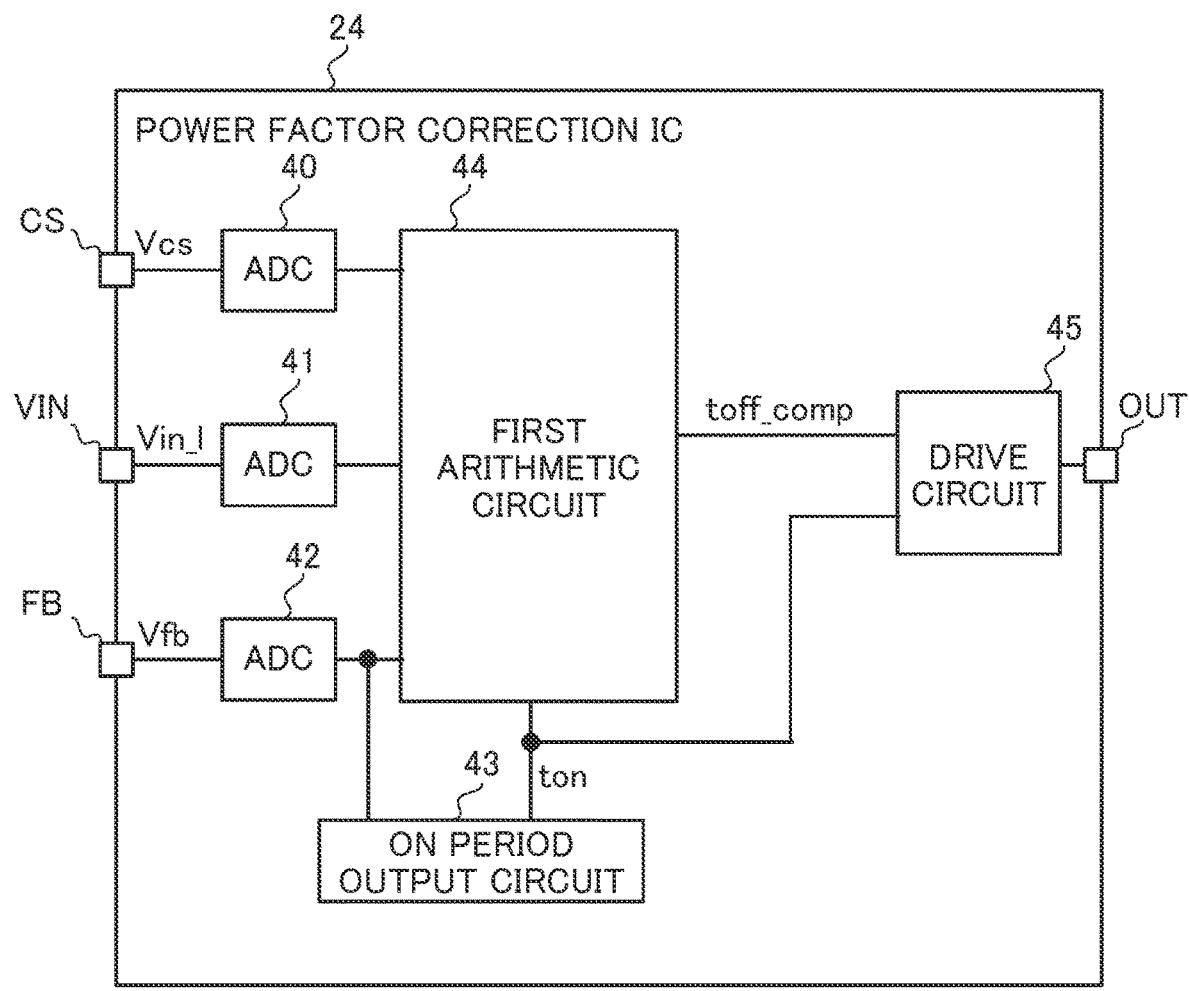
FIG. 4 is a diagram illustrating an example of a configuration of a power factor correction IC 24.

FIG. 4 is a diagram illustrating an example of a configuration of the power factor correction IC 24. The power factor correction IC 24 comprises analog-to-digital converter circuits (ADCs) 40 to 42, an ON period output circuit 43, a first arithmetic circuit 44, and a drive circuit 45.

Note that the terminals in FIG. 4 are illustrated in positions different from the positions in FIG. 1 for the sake of convenience, however, the wiring, elements, and the like coupled to the corresponding terminals are the same between FIGS. 1 and 4.

The ADC 40 converts the voltage Vcs at the terminal CS into a digital value and outputs the resultant to the first arithmetic circuit 44.

The ADC 41 converts the voltage Vin_1 at the terminal VIN into a digital value and outputs the resultant to the first arithmetic circuit 44.

The ADC 42 converts the voltage Vfb at the terminal FB into a digital value and outputs the resultant to the first arithmetic circuit 44. Hereinafter, the voltages Vcs, Vin_1, and Vfb inputted to the first arithmetic circuit 44 are described simply as the voltages Vcs, Vin_1, and Vfb although they are the digital values.

The ON period output circuit 43 outputs a digital value that indicates the ON period ton corresponding to a difference between the voltage Vfb and a reference voltage (not illustrated) serving as a reference for the output voltage Vout at the target level, to the first arithmetic circuit 44 and the drive circuit 45.

The first arithmetic circuit 44 calculates an OFF period toff_comp from when the NMOS transistor 25 is turned off to when the inductor current IL reaches substantially zero, and the details thereof will be described later. The phrase "the inductor current IL reaches substantially zero" means that the inductor current IL reaches a current value indicating substantially zero (for example, 1 mA). Hereinafter, for the sake of convenience, "substantially zero" is simply referred to as zero.

The drive circuit 45 causes the NMOS transistor 25 to be on in the ON period ton, and causes the NMOS transistor 25 to be off in the OFF period toff_comp.

The ADC 41 corresponds to a "first analog-to-digital converter circuit", the ADC 42 corresponds to a second analog-to-digital converter circuit", and the ADC 40 corresponds to a "third analog-to-digital converter circuit".

In addition, the voltage Vin_1 corresponds to a "first voltage", the voltage Vfb corresponds to a "second voltage", and the voltage Vcs corresponds to a "third voltage". The digital value of the voltage Vin_1 corresponds to a "first digital value", the digital value of the voltage Vfb corresponds to a "second digital value", and the digital value of the voltage Vcs corresponds to a "third digital value". The ON period output circuit 43 corresponds to an "output circuit".

<<<Configuration of First Arithmetic Circuit 44>>>

Figure 5:
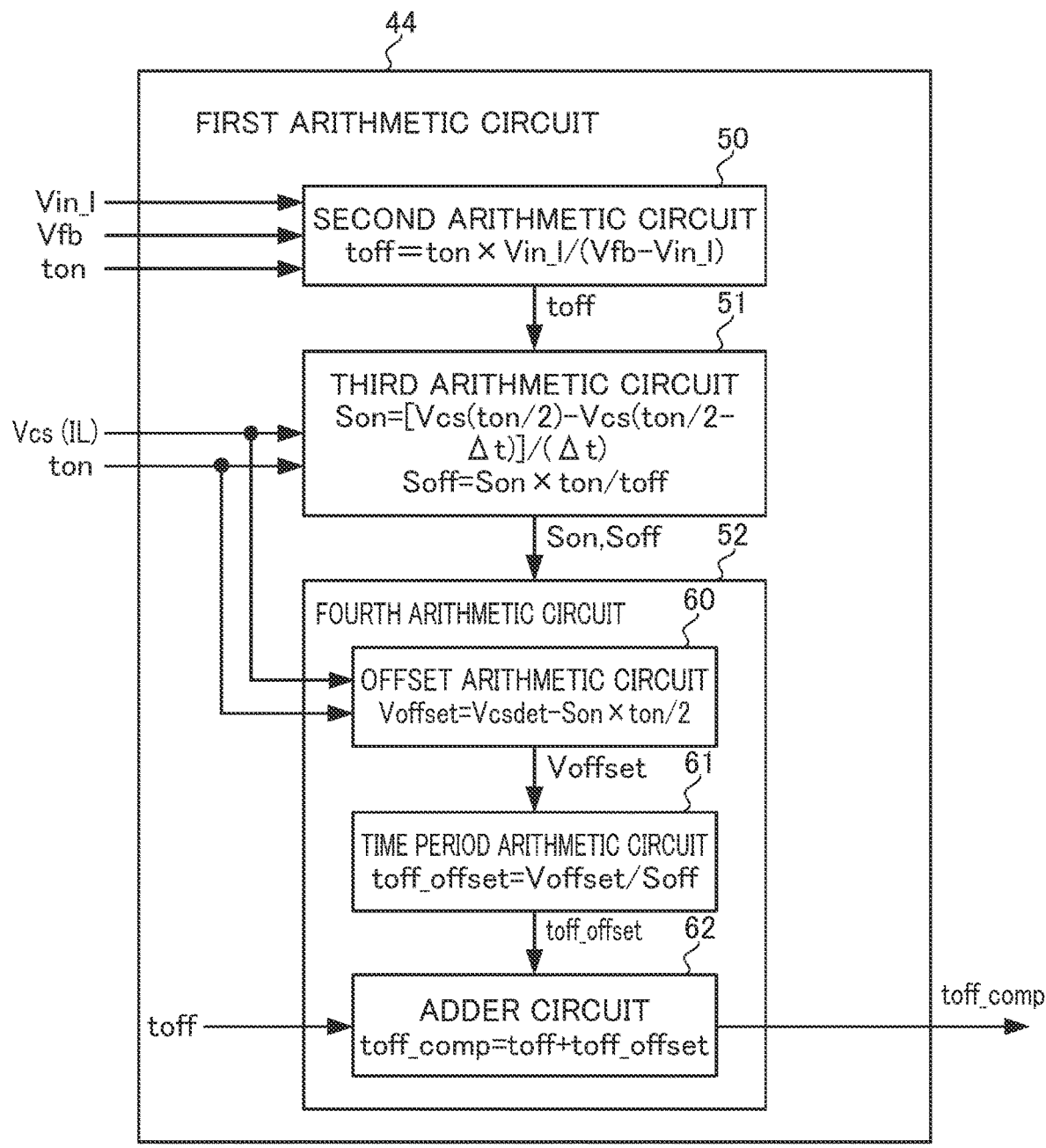
FIG. 5 is a diagram illustrating an example of a configuration of a first arithmetic circuit 44.

FIG. 5 is a diagram illustrating an example of a configuration of the first arithmetic circuit 44. The first arithmetic circuit 44 includes a second arithmetic circuit 50, a third arithmetic circuit 51, and a fourth arithmetic circuit 52.

The first arithmetic circuit 44 calculates the OFF period toff_comp from when the NMOS transistor 25 is turned off to when the inductor current reaches zero based on the voltages Vin_1, Vfb, and Vcs.

The OFF period toff_comp is calculated so as to cause the inductor current IL to reach zero, thereby being able to operate the AC-DC converter 10 in the critical mode. The voltage Vcs is generated by the resistor 26 when the inductor current IL flows through the resistor 26.

Hereinafter, the second arithmetic circuit 50, the third arithmetic circuit 51, and the fourth arithmetic circuit 52 will be described with reference to FIG. 6.

The second arithmetic circuit 50 calculates the OFF period toff in the time period toff_comp during which the NMOS transistor 25 is off based on the voltage Vin_1, the voltage Vfb, and the ON period ton during which the NMOS transistor 25 is on. Specifically, the second arithmetic circuit 50 calculates the OFF period toff by using the above-described expression (4) based on the voltages Vin_1 and Vfb and the ON period ton from the ON period output circuit 43.

The third arithmetic circuit 51 calculates the rate of decrease of the inductor current IL in the case where the NMOS transistor 25 is turned off. Specifically, as illustrated in FIG. 6, the third arithmetic circuit 51 obtains the voltage Vcs corresponding to the inductor current IL at least twice at around the half (ton/2) of the ON period ton and calculates the rate of increase Son of the inductor current IL during the ON period ton:

$$Son=[Vcs(ton/2)-Vcs(ton/2-\Delta t)]/(\Delta t) \quad (5).$$

Figure 6:
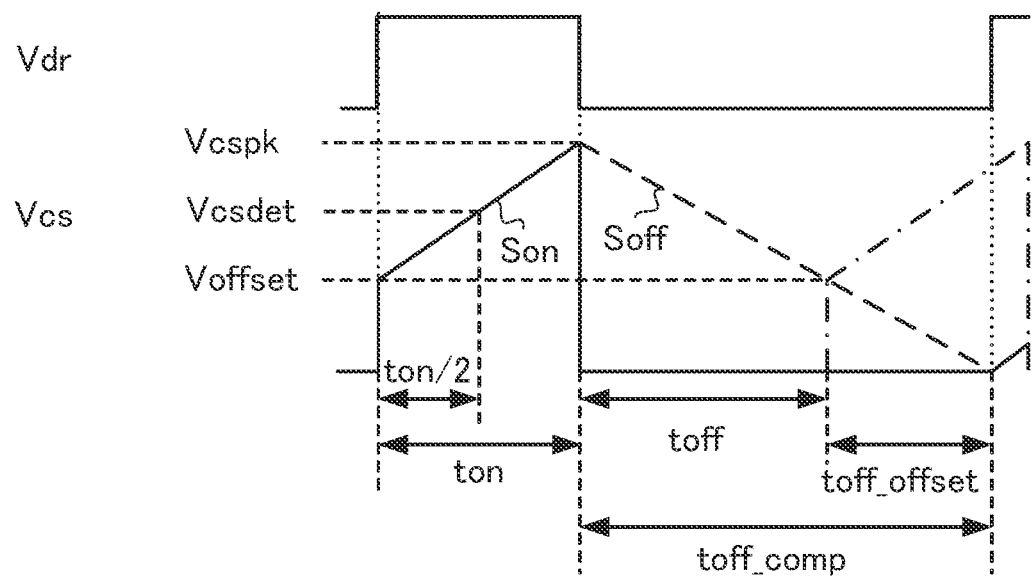
FIG. 6 is a diagram for explaining an operation of a first arithmetic circuit 44.

In FIG. 6, the rate of increase Son is equal to the variation in the voltage Vcs in the ON period ton, and thus the rate of increase Son is given by a solid oblique line. Here, the half (ton/2) of the ON period ton corresponds to a "predetermined timing".

Thereafter, the third arithmetic circuit 51 calculates the rate of decrease Soff of the inductor current IL in the OFF period toff by using the following expression based on the ON period ton, the OFF period toff calculated by the second arithmetic circuit 50, and the rate of increase Son. In FIG. 6, the rate of decrease Soff is equal to the variation in the voltage Vcs in the OFF period toff, and thus the rate of decrease Soff is given by a dotted oblique line:

$$Soff=Son \times ton/toff \quad (6).$$

The third arithmetic circuit 51 calculates the rate of increase Son based on the voltage Vcs around the half of the ON period ton, however, the third arithmetic circuit 51 may calculate the rate of increase Son based on the voltage Vcs at a timing after a predetermined time period has elapsed since the start of the ON period ton.

The calculation of the rate of increase Son based on the voltage Vcs at the timing after a lapse of the predetermined time period (ton/2) is desirable since it is possible to reduce the effect of noise upon turning on of the NMOS transistor 25.

The fourth arithmetic circuit 52 includes an offset arithmetic circuit 60, a time period arithmetic circuit 61, and an adder circuit 62, and calculates the OFF period toff_comp during which the NMOS transistor 25 is to be off based on the rate of decrease Soff.

The offset arithmetic circuit 60 calculates an offset value Voffset, which indicates a deviation of the inductor current IL from a predetermined value, based on the inductor current IL at the half (ton/2) of the ON period ton and the rate of increase Son.

Specifically, the offset arithmetic circuit 60 calculates the offset value Voffset by using the following expression based on a value Vcsdet of the voltage Vcs corresponding to the inductor current IL at the half (ton/2) of the ON period ton and the rate of increase Son:

$$Voffset = Vcsdet - Son \times ton/2 \quad (7).$$

The time period arithmetic circuit 61 calculate an offset period toff_offset by dividing the offset value Voffset by the rate of decrease Soff. Specifically, the time period arithmetic circuit 61 calculates the offset period toff_offset by using the following expression:

$$toff\_offset = Voffset/Soff \quad (8).$$

The adder circuit 62 calculates the OFF period toff_comp by adding the offset period toff_offset to the OFF period toff calculated by the second arithmetic circuit 50. Specifically, the adder circuit 62 calculates the OFF period toff_comp by using the following expression:

$$toff\_comp = toff + toff\_offset \quad (9).$$

The fourth arithmetic circuit 52 calculates the OFF period toff_comp by using the offset arithmetic circuit 60, the time period arithmetic circuit 61, and the adder circuit 62, however, the fourth arithmetic circuit 52 may calculate the OFF period toff_comp by using the following expression based on a peak value Vcspk of the inductor current IL and the rate of decrease Soff:

$$toff\_comp = Vcspk/Soff \quad (10).$$

The peak value Vcspk of the inductor current IL may be obtained from a value of the voltage Vcs in the end of the ON period ton or may be calculated by using the following expression:

$$Vcspk = Vcsdet + Son \times ton/2 \quad (11).$$

The OFF period toff_comp corresponds to a "first time period", the ON period ton corresponds to a "second time period", the OFF period toff corresponds to a "third time period", and the offset period toff_offset corresponds to a "fourth time period". The inductor current IL reaching zero corresponds to the inductor current IL reaching the "predetermined value".

<<<Operation of Power Factor Correction IC 24>>>

Figure 7:
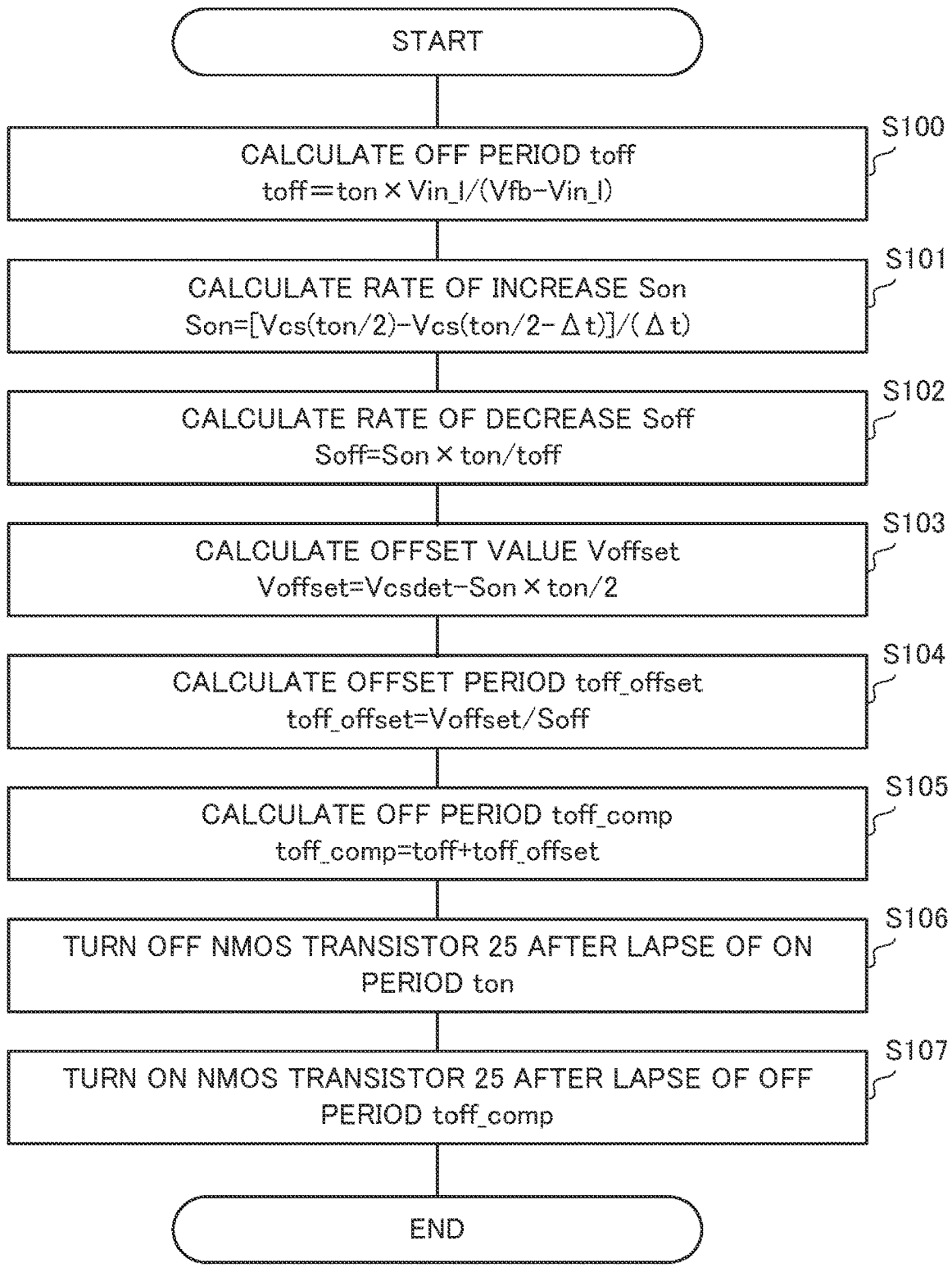
FIG. 7 is a flowchart indicating an operation of a power factor correction IC 24.
Figure 8:
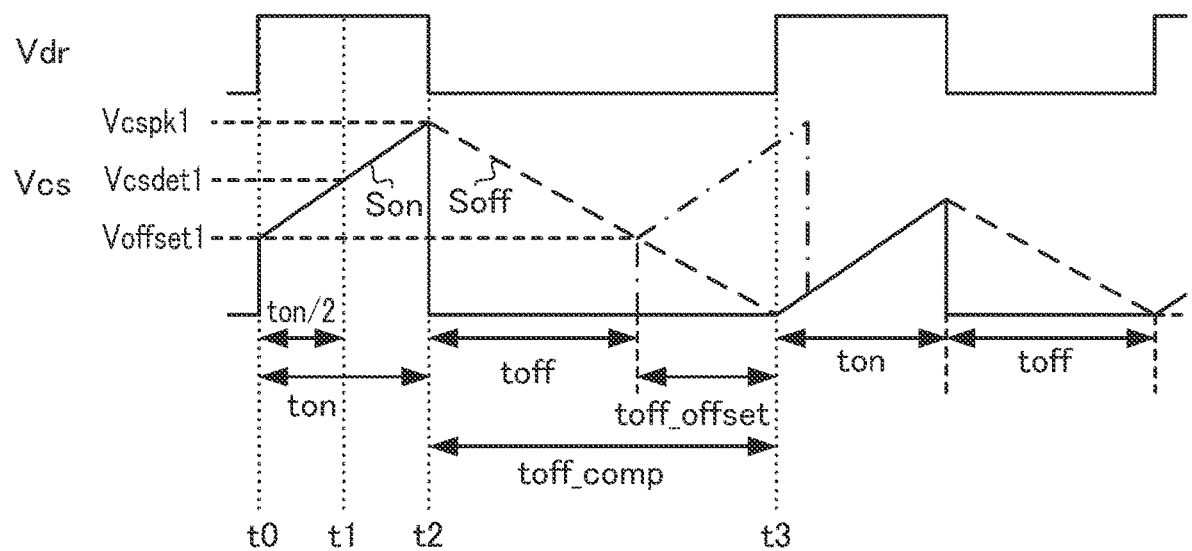
FIG. 8 is a diagram illustrating an example of a drive signal Vdr and a voltage Vcs when the AC-DC converter 10 operates in a critical mode.

FIG. 7 a flowchart indicating an operation of the power factor correction IC 24, and FIG. 8 is a diagram illustrating an example of the operation of the power factor correction IC 24.

Hereinafter, the operation of the power factor correction IC 24 will be described with reference to FIGS. 7 and 8.

At time t0 in FIG. 8, the power factor correction IC 24 outputs the high drive signal Vdr to start the ON period ton.

After the ON period ton starts, the second arithmetic circuit 50 calculates the OFF period toff by using the above-described expression (4) based on the voltages Vin_1 and Vfb and the ON period ton from the ON period output circuit 43 (S100).

At time t1 at which ton/2 has elapsed since the time t0, the third arithmetic circuit 51 obtains a value Vcsdet1 of the voltage Vcs corresponding to the inductor current IL to calculate the rate of increase Son (S101).

Thereafter, the third arithmetic circuit 51 calculates the rate of decrease Soff by using the above-described expression (6) based on the ON period ton and the OFF period toff and the rate of increase Son of the inductor current IL upon turning on of the NMOS transistor 25 (S102).

The offset arithmetic circuit 60 then calculates the offset value Voffset by using the above-described expression (7) based on the value Vcsdet1 and the rate of increase Son (S103).

Further, the time period arithmetic circuit 61 calculates the offset period toff_offset by using the above-described expression (8) (S104).

Finally, the adder circuit 62 calculates the OFF period toff_comp by adding the offset period toff_offset to the OFF period toff (S105).

Thereafter, at time t2 after a lapse of the ON period ton, the power factor correction IC 24 outputs the low drive signal Vdr, to thereby turn off the NMOS transistor 25 (S106).

Then, at time t3 after a lapse of the OFF period toff_comp, the power factor correction IC 24 outputs the high drive signal Vdr, to thereby turn on the NMOS transistor 25 (S107).

At time t3 and thereafter, the power factor correction IC 24 repeats the processes S100 to S107 in FIG. 7. If the inductor current IL reaches zero when the power factor correction IC 24 outputs the high drive signal Vdr to thereby turn on the NMOS transistor 25, the offset period toff_offset also results in being zero. Thus, the OFF period toff_comp becomes equal to the OFF period toff, to thereby operate the AC-DC converter 10 in the critical mode.

Accordingly, the power factor correction IC 24 according to an embodiment of the present disclosure makes it possible for the AC-DC converter 10 to continue to operate in the critical mode even if the inductor current IL upon turning on of the NMOS transistor 25 does not reach zero as illustrated at time t0 in FIG. 8.

Modification

Figure 9:
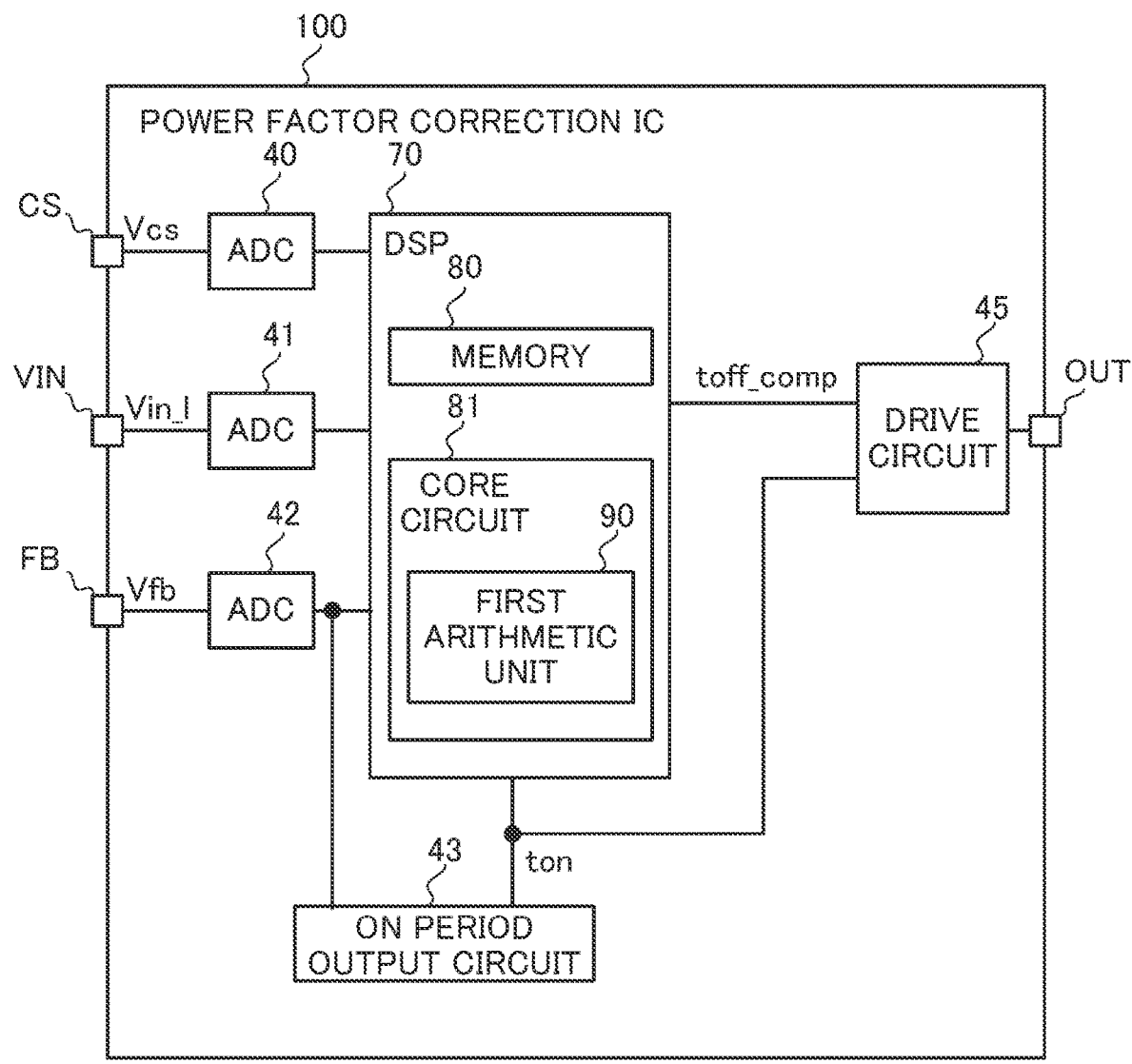
FIG. 9 is a diagram illustrating an example of a configuration of a power factor correction IC 100.

FIG. 9 is a diagram illustrating an example of a configuration of a power factor correction IC 100 including a digital signal processing circuit (DSP). Note that, in FIG. 9, the circuits that are the same as those illustrated in FIG. 4 are given the same reference numerals.

The power factor correction IC 100 comprises the analog-to-digital converter circuits (ADCs) 40 to 42, the ON period output circuit 43, a DSP 70, and the drive circuit 45.

The DSP 70 comprises: a memory 80 storing a program for operating the power factor correction IC 100; and a core circuit 81 that performs calculation to operate the AC-DC converter 10 in the critical mode.

The core circuit 81 implements various functional blocks in the DSP 70 by executing the program stored in the memory 80. The core circuit 81 implements a first arithmetic unit 90 that performs calculation to operate the AC-DC converter 10 in the critical mode.

Note that, although detailed descriptions are omitted, the first arithmetic unit 90 corresponds to the first arithmetic circuit 44 of the power factor correction IC 24, and performs the processes in FIG. 7 that are to be performed by the first arithmetic circuit 44. Accordingly, even when the power factor correction IC 100 as such is used, it is possible to operate the AC-DC converter 10 in the critical mode. The memory 80 corresponds to a "storage circuit", and the core circuit 81 corresponds to an "arithmetic circuit".

Summary

The AC-DC converter 10 according to an embodiment of the present disclosure has been described above. The first arithmetic circuit 44 of the power factor correction IC 24 calculates the OFF period toff_comp from when the NMOS transistor 25 is turned off to when the inductor current IL reaches zero based on the voltages Vin_1 and Vfb and the voltage Vcs upon turning on of the NMOS transistor 25.

This makes it possible for the power factor correction IC 24 to cause the AC-DC converter 10 to operate in the critical mode even when the resistance value of each of the resistors 30 to 33 constituting the first voltage divider circuit and the second voltage divider circuit deviates from the rated value.

The first arithmetic circuit 44 calculates the OFF period toff based on the voltages Vin_1 and Vfb and the ON period ton, calculates the rate of decrease Soff, and calculates the OFF period toff_comp. This can make the inductor current IL flowing during the ON period ton and the inductor current IL flowing during the OFF period toff_comp substantially equal to each other without continuing to measure the inductor current IL flowing during the ON period ton. In addition, the power factor correction IC 24 can cause the AC-DC converter 10 to operate in the critical mode. There is no need to provide auxiliary winding for detecting the inductor current IL upon turning off of the NMOS transistor 25 and a resistor fora negative detection.

The third arithmetic circuit 51 calculates the rate of decrease Soff based on the ON period ton, the OFF period toff, and the rate of increase Son. This makes it possible to calculate the rate of decrease Soff without measuring the inductor current IL while the NMOS transistor 25 is off.

The third arithmetic circuit 51 calculates the rate of increase Son based on the voltage Vcs at ton/2 in the ON period ton. This makes it possible to calculate the rate of decrease Soff without measuring the inductor current IL while the NMOS transistor 25 is off, as described above.

The voltage Vcs is detected at ton/2 in the ON period ton, thereby being able to reduce the effect of noise upon turning on of the NMOS transistor 25.

The fourth arithmetic circuit 52 calculates the offset value Voffset indicating a deviation of the inductor current IL from zero based on the inductor current IL at ton/2 in the ON period ton and the rate of increase Son, calculates the offset period toff_offset by dividing the offset value Voffset by the rate of decrease Soff, and calculates the OFF period toff__comp by adding the offset period toff_offset to the OFF period toff. This makes it possible to calculate the offset value Voffset and calculate the OFF period toff_comp without being affected by noise upon turning on of the NMOS transistor 25.

The OFF period toff_comp may also be calculated based on the peak value Vcspk of the voltage Vcs in the end of the ON period ton.

The ON period ton can be calculated based on a difference between the voltage Vfb and the reference voltage indicating the voltage Vfb at a time when the output voltage Vout reaches the target level.

The first arithmetic circuit 44 of the power factor correction IC 24 can calculate the OFF period toff_comp based on the digital values of the voltages Vin_1, Vfb and Vcs.

The power factor correction IC 24 can cause the AC-DC converter 10 to operate in the critical mode according to the ON period ton and the OFF period toff_comp.

The power factor correction IC 24 may include the digital signal processing circuit.

The circuit according to an embodiment of the present disclosure is suitable to be used in a power supply circuit.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

It is possible to provide a technique of causing an AC-DC converter to operate in a critical mode even when a value of an element of the AC-DC converter deviates from a rated value.

What is claimed is:

1. A switching control circuit for controlling a power supply circuit that generates an output voltage from an alternating current (AC) voltage inputted thereto, the power supply circuit including
    an inductor configured to receive a rectified voltage corresponding to the AC voltage,
    a transistor configured to control an inductor current flowing through the inductor,
  the switching control circuit being configured to control switching of the transistor, the switching control circuit comprising:
    a first arithmetic circuit configured to calculate a first time period, which is from when the transistor is turned off to when the inductor current reaches a predetermined value, based on
      a first voltage corresponding to the rectified voltage,
      a second voltage corresponding to the output voltage, and
      the inductor current upon turning on of the transistor; and
    a drive circuit configured to
      cause the transistor to be on in a second time period corresponding to the second voltage, and
      cause the transistor to be off in the first time period.

2. The switching control circuit according to claim 1, wherein
  the first arithmetic circuit includes
    a second arithmetic circuit configured to calculate a third time period in a time period during which the transistor is off, based on the first voltage, the second voltage, and the second time period during which the transistor is on,
    a third arithmetic circuit configured to calculate a rate of decrease of the inductor current when the transistor is off based on at least the third time period, and
    a fourth arithmetic circuit configured to calculate the first time period during which the transistor is off based on the rate of decrease.

3. The switching control circuit according to claim 2, wherein
  the third arithmetic circuit calculates the rate of decrease based on
    the second and third time periods, and
    a rate of increase of the inductor current when the transistor is on.

4. The switching control circuit according to claim 3, wherein
  the third arithmetic circuit calculates the rate of increase based on a third voltage corresponding to the inductor current at a predetermined timing in the second time period.

5. The switching control circuit according to claim 4, wherein
  the predetermined timing is a timing at which a predetermined time period has elapsed since start of the second time period.

6. The switching control circuit according to claim 4, wherein the fourth arithmetic circuit includes
  an offset arithmetic circuit configured to calculate an offset value indicating a deviation of the inductor current from the predetermined value based on the inductor current at the predetermined timing and the rate of increase, a time period arithmetic circuit configured to calculate a fourth time period by dividing the offset value by the rate of decrease, and an adder circuit configured to calculate the first time period by adding the fourth time period to the third time period.

7. The switching control circuit according to claim 2, wherein the fourth arithmetic circuit calculates the first time period based on a peak value of the inductor current and the rate of decrease.

8. The switching control circuit according to claim 1, further comprising:

an output circuit configured to output the second time period based on a difference between the second voltage and a reference voltage serving as a reference for the output voltage.

9. The switching control circuit according to claim 1, further comprising:

a first analog-to-digital converter circuit configured to convert, into a first digital value, the first voltage from a first voltage divider circuit that generates the first voltage by dividing the rectified voltage;

a second analog-to-digital converter circuit configured to convert, into a second digital value, the second voltage from a second voltage divider circuit that generates the second voltage by dividing the output voltage; and a third analog-to-digital converter circuit configured to convert, into a third digital value, a voltage generated at a resistor provided on a ground side of the transistor.

10. The switching control circuit according to claim 1, wherein, the predetermined value is a value for operating the power supply circuit in a critical mode, in which the transistor is turned on when the inductor current flowing therethrough reaches substantially zero.

11. A switching control circuit for controlling a power supply circuit that generates an output voltage from an alternating current (AC) voltage inputted thereto, the power supply circuit including an inductor configured to receive a rectified voltage corresponding to the AC voltage, a transistor configured to control an inductor current flowing through the inductor, the switching control circuit being configured to control switching of the transistor, the switching control circuit comprising:

a storage circuit; and an arithmetic circuit, the arithmetic circuit including a first arithmetic unit configured to calculate a first time period, which is from when the transistor is turned off to when the inductor current reaches a predetermined value, based on a first voltage corresponding to the rectified voltage, a second voltage corresponding to the output voltage, and the inductor current upon turning on of the transistor.

12. A power supply circuit that generates an output voltage from an alternating current (AC) voltage inputted thereto, the power supply circuit comprising:

an inductor configured to receive a rectified voltage corresponding to the AC voltage;

a transistor configured to control an inductor current flowing through the inductor;

a first arithmetic circuit configured to calculate a first time period, which is from when the transistor is turned off to when the inductor current reaches a predetermined value, based on a first voltage corresponding to the rectified voltage, a second voltage corresponding to the output voltage, and the inductor current upon turning on of the transistor; and a drive circuit configured to cause the transistor to be on in a second time period corresponding to the second voltage, and cause the transistor to be off in the first time period.

\* \* \* \* \*